United States Patent [19]

Newton

[11] Patent Number: 4,512,213
[45] Date of Patent: Apr. 23, 1985

[54] SPEED REDUCER

[76] Inventor: Alan R. Newton, 67 Bluebird Ave., East Wareham, Mass. 02538

[21] Appl. No.: 560,540

[22] Filed: Dec. 12, 1983

Related U.S. Application Data

[63] Continuation-in-part of Ser. No. 316,753, Oct. 30, 1981, abandoned, which is a continuation-in-part of Ser. No. 218,470, Dec. 22, 1980, abandoned.

[51] Int. Cl.³ ............................................. F16H 1/28
[52] U.S. Cl. ....................................... 74/805; 74/804
[58] Field of Search ................................... 74/804, 805

[56] References Cited

U.S. PATENT DOCUMENTS

| | | | |
|---|---|---|---|
| 474,903 | 5/1892 | Cottrell | 74/805 |
| 1,590,166 | 6/1926 | Howard | 74/804 |
| 2,475,504 | 7/1949 | Jackson | 74/804 |
| 2,481,627 | 9/1949 | Sharpe | 74/804 |
| 2,495,811 | 1/1950 | Hollmann | 74/804 |
| 2,709,929 | 6/1955 | Godwin | 74/804 X |
| 2,748,616 | 6/1956 | Foster et al. | 74/805 X |
| 3,011,304 | 12/1961 | Sundt | 74/805 X |
| 3,028,513 | 4/1962 | Sundt | 74/804 |
| 3,160,032 | 12/1964 | Black | 74/804 |
| 3,307,434 | 3/1967 | Kope | 74/804 |
| 3,424,036 | 1/1969 | Colgan | 74/805 |
| 3,903,750 | 9/1975 | Takasu | 74/116 |
| 3,924,478 | 12/1975 | Takasu | 74/116 |
| 3,975,973 | 8/1976 | Haase | 74/805 |
| 4,016,780 | 4/1977 | Baranyi | 74/804 |

FOREIGN PATENT DOCUMENTS

| | | | |
|---|---|---|---|
| 130523 | 11/1932 | Fed. Rep. of Germany | 74/805 |
| 1933131 | 1/1971 | Fed. Rep. of Germany | 74/805 |
| 2424042 | 1/1975 | Fed. Rep. of Germany | 74/805 |
| 2635088 | 2/1977 | Fed. Rep. of Germany | 74/804 |
| 711700 | 5/1930 | France | 74/804 |
| 772653 | 11/1934 | France | 74/805 |
| 797130 | 4/1936 | France | 74/805 |
| 990493 | 7/1949 | France | 74/805 |
| 587951 | 1/1959 | Italy | 74/805 |
| 311744 | 5/1930 | United Kingdom | 74/805 |
| 506655 | 6/1939 | United Kingdom | 74/805 |
| 11512 | 9/1985 | United Kingdom | 74/805 |

*Primary Examiner*—George H. Krizmanich
*Assistant Examiner*—Dirk Wright
*Attorney, Agent, or Firm*—Wolf, Greenfield & Sacks

[57] ABSTRACT

The speed reducing mechanism is of simple construction and is easily adapted for providing different ratios of speed reduction, particularly a high ratio of speed reduction. The mechanism comprises inner and outer gears in planar engagement and a non-rotatable shifter member. In alternate embodiments, either the inner gear or the outer ring gear may be rotatable. In one disclosed embodiment the inner gear is driven by the input shaft under control of the shifter member to engage at its periphery with the ring gear causing the ring gear to be driven thereby. The inner gear tracks within the ring gear but is maintained non-rotatable by the shifter member. The gear ratio is a function of the number of teeth externally on the inner gear in comparison with the number of internal teeth on the ring gear. The closer in number the teeth, the higher the reduction ratio. In another embodiment the speed reducer is in the form of a hand operated winch.

6 Claims, 27 Drawing Figures

SPEED REDUCER

RELATED APPLICATION

This application is a continuation-in-part of application Ser. No. 316,753 filed Oct. 30, 1981 now abandoned which in turn is a continuation-in-part of application Ser. No. 218,470 filed Dec. 22, 1980 now abandoned.

BACKGROUND OF THE INVENTION

The present invention relates in general to a speed reducer, and pertains, more particularly, to a relatively simple mechanism for speed reduction adapted particularly for providing a high ratio of speed reduction. The mechanism of this invention is particularly characterized by simple design requiring only a few component parts to provide speed reduction up to substantial ratios of reduction.

Following U.S. Pat. Nos. show different constructions of gear drives; 4,016,780; 3,975,973; 3,924,478; 3,903,750; 3,028,513; 3,160,032; and 2,475,504. These prior art mechanisms have one primary disadvantage in that they are generally complex in construction, particularly when exhibiting any substantial ratio of speed reduction. However, in accordance with the present invention there is provided a relatively simple construction and one which is easily adapted to provide a high ratio of speed reduction.

Accordingly, one object of the present invention is to provide an improved speed reducer, particularly one that is of simplified construction and that is readily adapted for designs having a substantial speed reduction per stage.

Another object of the present invention is to provide a speed reducer that is simple in construction and that is readily adapted for ease in manufacture preferably having a minimum number of components in the basic design.

SUMMARY OF THE INVENTION

To accomplish the foregoing and other objects of this invention, there is provided a speed changing mechanism which in the disclosed embodiment is adapted to function as a speed reducer. This mechanism generally comprises a housing, first and second gear means, and a shifting means which is defined hereinafter as an X-Y shifter. The gears are supported in the housing in planar relationship with one of the gears being in the form of a pinion gear having external teeth and the other being a ring gear having internal teeth. The number of teeth of each of the gears is different with the number of teeth of the pinion gear being less than the number of teeth provided on the ring gear. The difference in number between the teeth on the pinion and ring gears is determinative of the speed reduction ratio. The less the difference is, the greater the speed reduction ratio. Theoretically, with the like numbers of teeth on each gear then there is an infinite speed reduction ratio. The X-Y shifter is disposed in the housing in adjacent parallel relationship to the first and second gears. Means are provided associated with the shifter for supporting it in a non-rotational manner but permitting limited X-Y translation thereof. Input drive means couple to the first gear means and means are also provided intercoupling the shifting means and the first gear means whereby the input drive to the first gear means causes non-rotational translation of the first gear means relative to the second gear means to thereby cause the second gear means to rotate as a result of interference engagement between the first and second gear means. Finally, means are provided for deriving an output from the second gear means.

There are described herein, three separate embodiments of the invention. In two of these embodiments, the input drive is to the pinion gear and the output is taken from the ring gear. In a third embodiment that is described, the input drive is coupled to the ring gear and the output is taken from the pinion gear. There are also described herein, a number of different ways of providing for the X-Y translation of the input gear that is driven. There is an X-Y shifter employed in each embodiment. In a first embodiment this shifter comprises a plate having diametrically disposed slots for receiving diametrically disposed pins of the pinion gear. Opposite to these slots are provided guide bars to permit limited horizontal translation of the shifter. In a second embodiment as described, the ring gear has four slots disposed at 90° intervals and the X-Y shifter has similarly disposed sliders. In a last embodiment of the invention there is provided an X-Y shifter having four sets of slots with a pair of pins from the housing limiting sideways translation of the shifter. There is also provided an intermediate coupling plate between the shifter and the ring gear with a pair of diametrically disposed pins extending to either side of the coupling plate into the ring gear and also into the other set of slots in the shifter. With the arrangement of the present invention there is a back pressure against the X-Y shifter which is absorbed by the bearings and bushings that are employed for permitting movement only along X-Y axes. Also, the device is in a virtually locked position when the driver is non-operating due to this X-Y shifter construction in association with the gears.

When the input shaft is rotated, which is typically by an eccentric arrangement such as depicted in the first embodiment therein, the X-Y shifter slides on its Y axis, while the pinion gear pins slide in the slots in the slider. This discussion is making reference to the first embodiment. This action produces the orbital motion on the X and Y axes. The rotary motion of the output piece, such as the ring gear is caused by the partial mismatching of tooth and tooth spacing as the pinion gear orbits within the ring gear. There is a continual chasing action of tooth to space alignment.

In still another embodiment of the present invention described herein, the speed reducer is made in a more simplified form and embodied as a boat/trailer winch. In the winch embodiment of the invention there is a hand-operated spool supported within a U-shaped bracket, and further including a pinion gear and intermeshing ring gear. A shaft associated with the hand crank and extending through the spool eccentrically drive the pinion gear which is prevented from rotation by means of a slot and pin arrangement with the slot being provided in the bracket and the pin extending from the pinion gear.

BRIEF DESCRIPTION OF THE DRAWINGS

Numerous other objects, features and advantages of the invention should now be apparent upon a reading of the following detailed description taken in conjunction with the accompanying drawings, in which.

DETAILED DESCRIPTION

Figure 1:
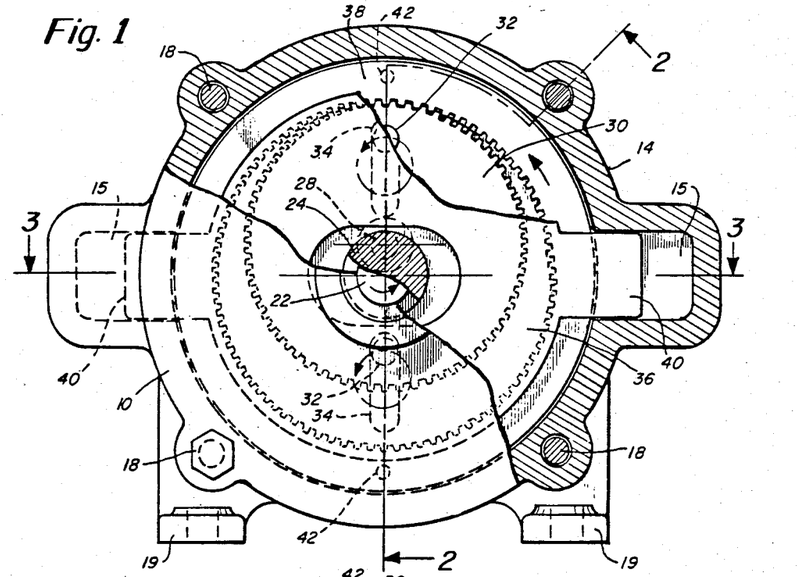
FIG. 1 is a partially cut away view of a first embodiment of the speed reducer of this invention.
Figure 2:
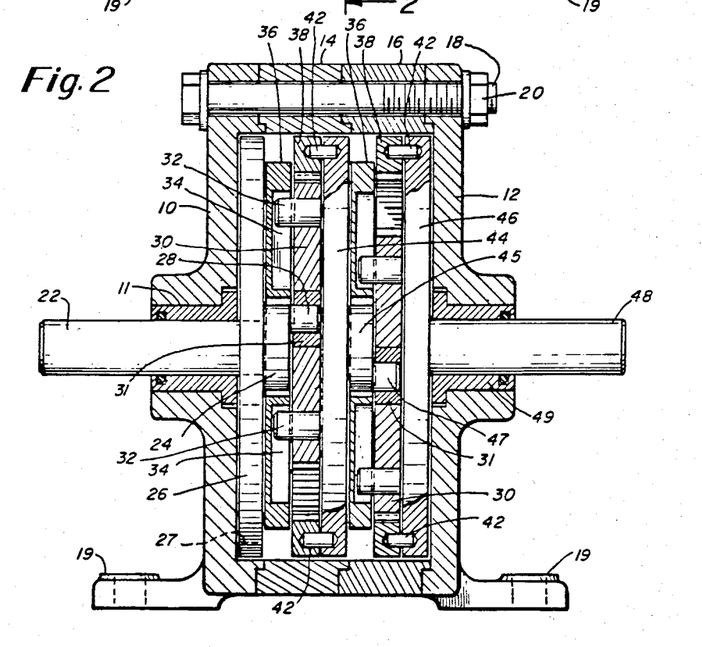
FIG. 2 is a cross-sectional view of the first embodiment as taken along line 2—2 of FIG. 1.
Figure 3:
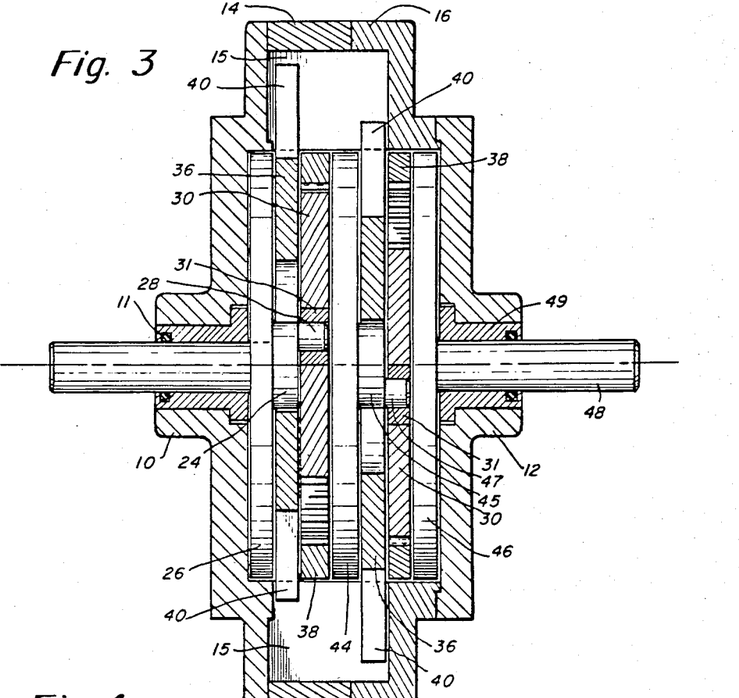
FIG. 3 is a further cross-sectional view with the input shaft rotated 90° from that shown in FIG. 1.
Figure 4:
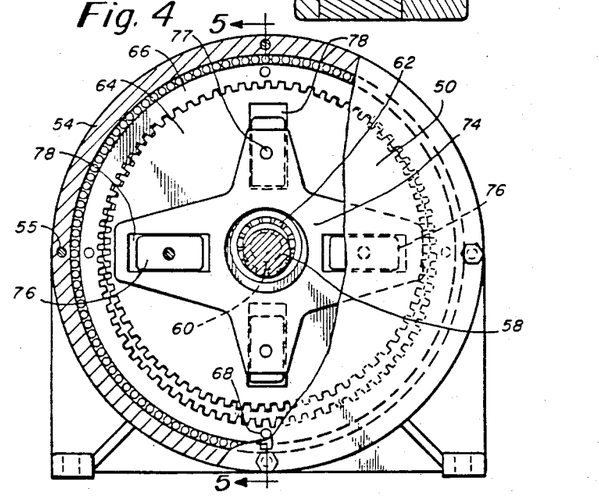
FIG. 4 is a further view of an alternate embodiment of the invention.
Figures 5, 6:
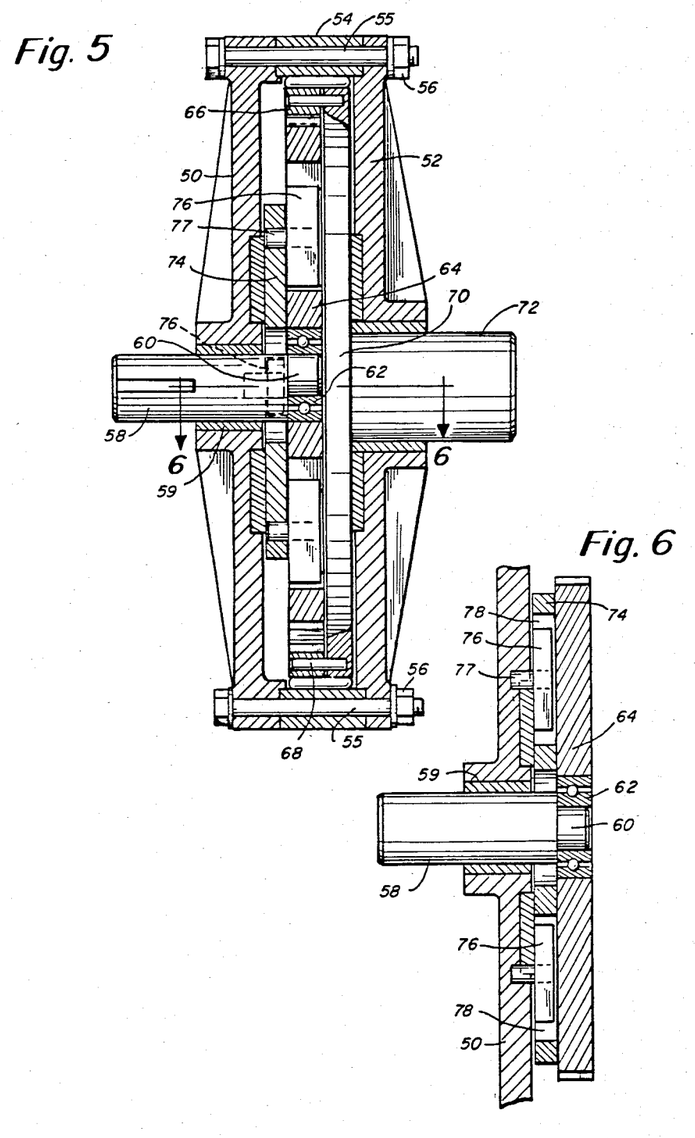
FIG. 5 is a cross-sectional view through the second embodiment as taken along line 5—5 of FIG. 4.
FIG. 6 is a further detail of this second embodiment taken along line 6—6 of FIG. 5.
Figure 7:
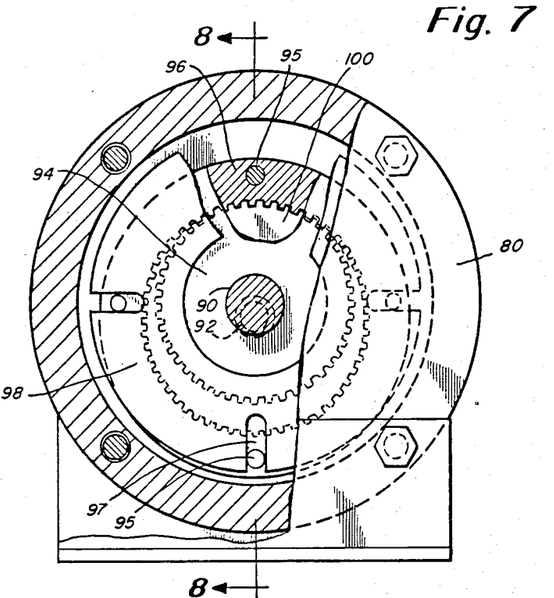
FIG. 7 shows a third embodiment of the present invention wherein the input is to the ring gear rather than to the pinion gear.
Figure 8:
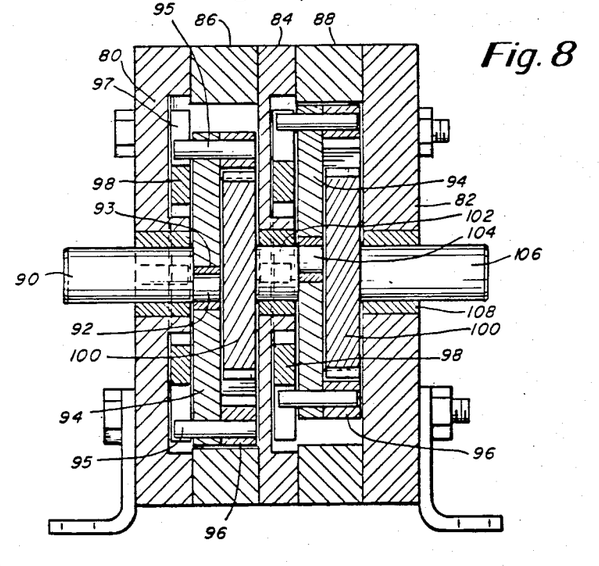
FIG. 8 is a cross-sectional view of this third embodiment as taken along line 8—8 of FIG. 7.
Figure 9:
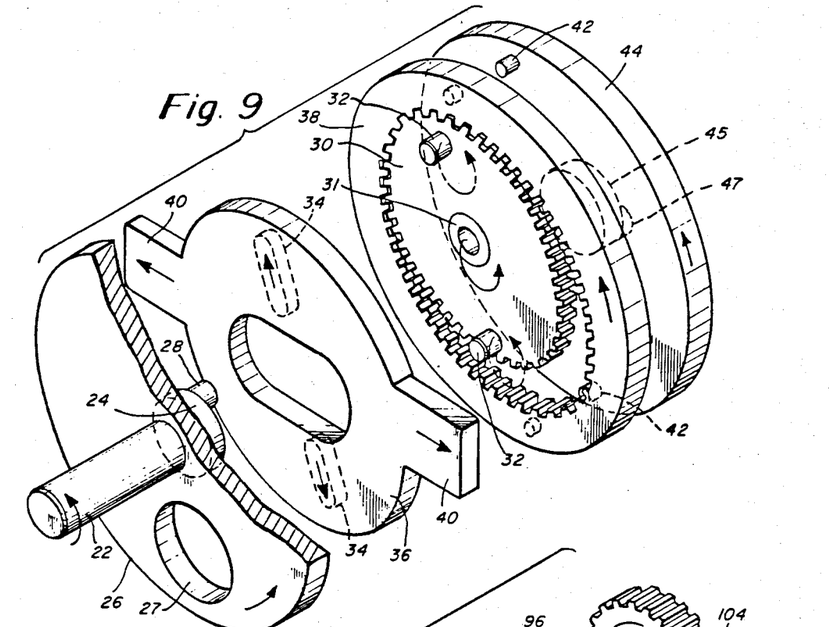
FIG. 9 is an exploded perspective view of one stage of the reducer depicted in the first embodiment of FIGS. 1-3.
Figure 10:
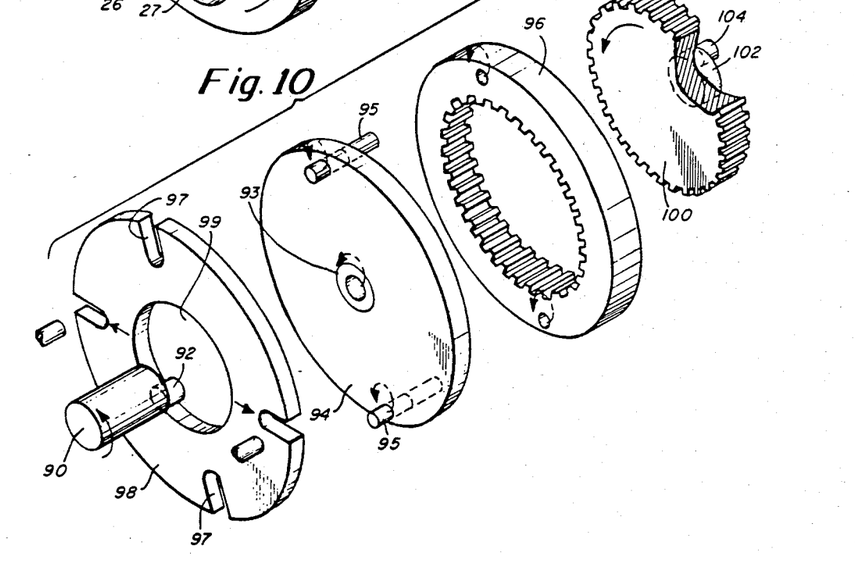
FIG. 10 is an exploded perspective view of a single stage of a speed reducer shown in the third embodiment of FIGS. 7 and 8.
Figure 11:
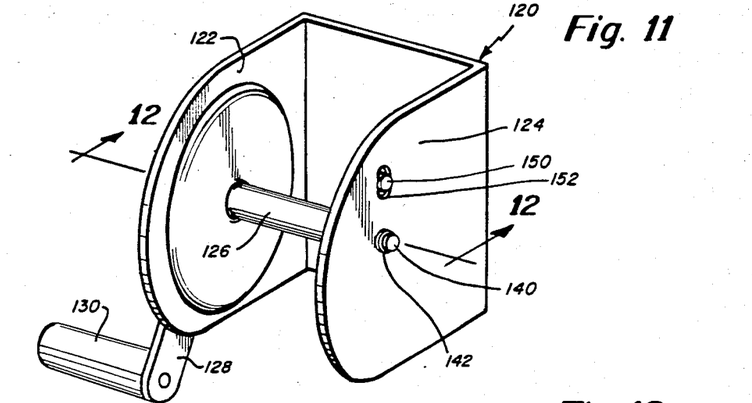
FIG. 11 is a perspective view showing the concepts of the speed reducer as applied to a boat/trailer winch.
Figure 12:
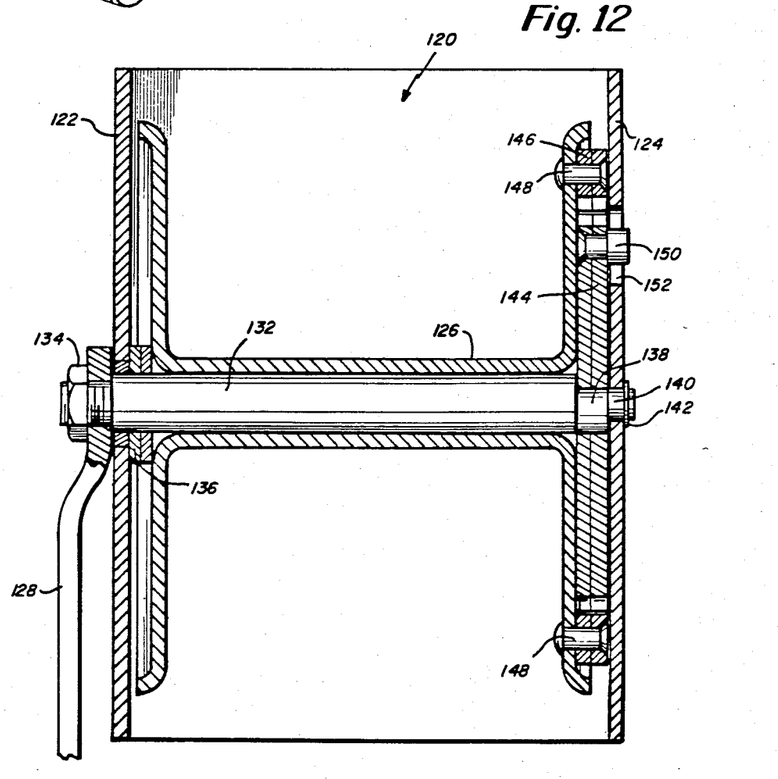
FIG. 12 is a cross-sectional view taken along line 12—12 of FIG. 11.
Figure 13:
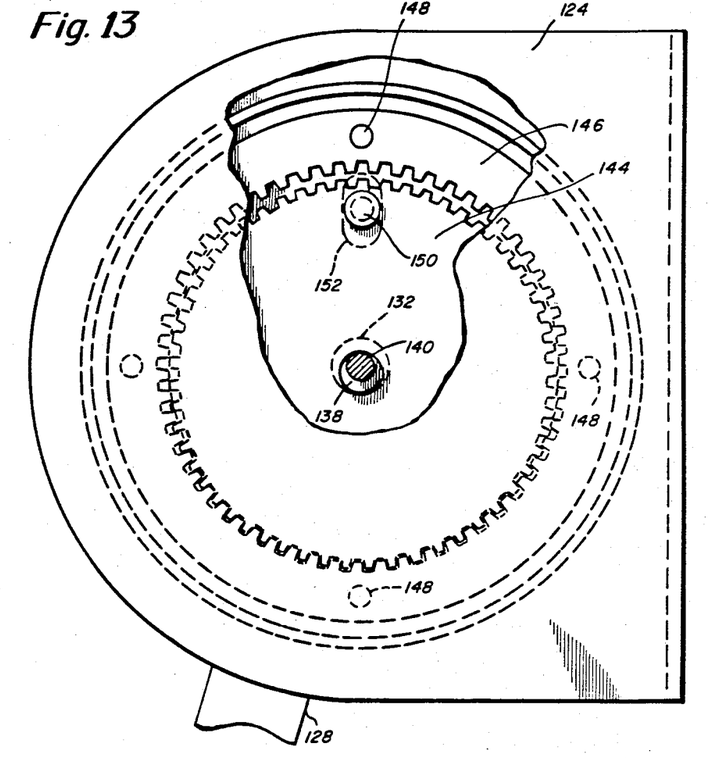
FIG. 13 is a partially cut away side view of the winch shown in FIG. 11.

Referring now to the drawings, there is shown three different embodiments of the present invention. A first embodiment is shown in FIGS. 1-3. A second embodiment is shown in FIGS. 4-6. Finally, a third embodiment is shown in FIGS. 7 and 8. FIGS. 9 and 10 are exploded perspective views associated with two of the different embodiments described. The embodiments that are illustrated cover the alternate embodiments wherein the inner gear or the outer ring gear is rotatable. FIGS. 11-15 show two other embodiments of the present invention. In FIGS. 11-13 is a simplified boat winch employing the speed reducer of this invention. FIGS. 16-27 show further alternate embodiments of the present invention in particular illustrating simplified eccentric mechanisms.

A first embodiment of the invention is shown in FIGS. 1-3. With regard to this embodiment, reference is also made to the exploded perspective view of FIG. 9. FIG. 9 illustrates one of the two different stages that are depicted in FIGS. 1-3. In this embodiment, there is provided an input end plate 10 and an output end plate 12. These end plates define a portion of a housing which may also be considered as including spacers 14 and 16. There are provided a plurality of bolts 18 and associated nuts 20 that are used to secure the end plates and the space spacers. As illustrated in FIG. 1, the end plates may include legs 19 with possibly two being used on each end plate to define four legs for the speed reducing device.

The input end plate 10 has a centrally disposed bushing 11 adapted to rotatably support the input shaft 22. The input shaft 22 has an enlarged end 24 that also functions as a shoulder for limiting the position of the dynamic balance plate 26. As noted, for example, in FIG. 9, the dynamic balance plate 26 is provided with a compensating opening 27. On the enlarged end 24 of the input shaft there is provided an eccentrically located pin 28 which is adapted to be received by the inner gear 30. In the embodiment shown in FIG. 2, the inner gear 30 has a central bushing 31 for receiving the pin 28. The inner gear 30 also is provided with diametrically disposed pins 32 that extend in the direction toward the input shaft. The pins 32 engage within diametrically disposed slots 34 in the X-Y shifter 36.

The inner gear 30 is provided with a series of external teeth adapted to mate with internal teeth on a ring gear 38. The X-Y shifter 36, in addition to having the diametrically disposed slots 34 is also provided with opposite aligning bars 40. This arrangement of the shifter 36 prevents rotational movement of the shifter but permits translational side-to-side movement such as illustrated in FIG. 1 wherein the spacer 14 is designed to have oppositely disposed slots 15 for accommodating the oppositely disposed aligning bars 40.

Coupled with the ring gear 38, by means of pins 42 is the inermediate plate 44 which couples power from the ring gear of one stage to the inner gear of the next stage. In this first embodiment, the second stage components are identified by like reference characters to those used with the identification for the first stage. Thus, the second stage also incudes an X-Y shifter 36, an inner gear 30, and an outer ring gear 38. Finally, the output pins 42 couple between the second stage ring gear 38 and an output plate 46 which is integral with the output shaft 48. The output shaft 48 extends through the output end plate 12 and is received in the bushing 49. The intermediate plate 44 has an output member 45 with an eccentric pin 47 that couples to the second stage inner gear 30. Thus, in this embodiment each stage is substantially identical with the two stages being essentially interconnected by the intermediate drive plate 44.

In the first embodiment herein described, the inner gear 30 is driven from the input shaft 22. The inner gear is arranged so that it is in engagement with the inner teeth of the ring gear. The teeth may be of standard form or they may be specially designed. One of the gears causes the other to rotate as a result of calibrated, integral interference between the inner and outer gears. The X-Y shifter prevents rotation of the inner gear and the inner gear instead circumscribes a circular locus defined by the teeth of the ring gear. The slots 34 in the X-Y shifter essentially control the vertical component of transition of the inner gear while the diametrically disposed bars 40 control the horizontal component or transition of the inner gear.

If the inner and outer gears both have like number of teeth, then theoretically there would be no rotation of the ring gear. However, the gears are selected so that the ring gear has a greater number of teeth than the inner gear so that for one full rotation of the input shaft and one complete transition of the inner gear, there is a partially full rotation of the ring gear which is a function of the difference in the number of teeth between the inner and outer gears. The closer in number of teeth between the respective gears, the greater the speed reduction. For example, if the ring gear has 30 teeth and the inner gear 25 teeth, then there is a speed reduction in a ratio of 5 to 1. As the difference between the numbering of teeth decreases, the speed reduction increases.

The second embodiment of the present invention is depicted in FIGS. 4-6. This embodiment is quite similar to the first embodiment and includes a housing defined primarily by an input end plate 50, an output end plate 52, and a spacer 54. There are provided a plurality of bolts 55 and associated nuts 56 that secure the end plates and spacer to define an enclosed housing. In this second embodiment depicted in FIGS. 4-6, there is only a single stage of speed reduction. The input shaft 58 couples through a bushing 59 in the input end plate 50. The input shaft 58 has an eccentrically disposed end pin 60 that is received in a bearing 62 secured in gear 66. In this embodiment the inter-engagement of the inner and outer gears is substantially the same as disclosed in the first embodiment. The ring gear is secured by pins 68 to the output member 70 which comprises an output shaft 72.

For controlling the movement of the inner gear within the outer gear there is provided an X-Y shifter 74 which is of substantially different construction than the one described in the first embodiment. This X-Y shifter has four sliders 76 which are attached by associated pins 77 to the main frame of the X-Y shifter. Two of these sliders are adapted to move in elongated slots 78 in the inner gear 64 and two sliders in the X-Y shifter 74. By providing this combination of four sliders with associated slots in the inner gear and the X-Y shifter, disposed at 90° intervals, the X-Y slider controls the displacement of the inner gear.

The last embodiment of the present invention is described in FIGS. 7 and 8. In this embodiment, the primary difference is that the input shaft couples to the ring gear rather than to the inner gear. In the particular embodiment described in FIGS. 7 and 8 there are shown two stages. FIG. 10 is an exploded perspective view showing one of these stages.

The housing employed in this third embodiment may be considered as comprising an input end plate 80, an output end plate 82, intermediate support plate 84, and spacers 86 and 88. There is an input shaft 90 having at its end an eccentrically disposed pin 92 received in a bushing 93 mounted in the coupling plate 94. This coupling plate 94 also supports pins 95 extending therethrough. These pins pass into an aperture in the ring gear 96 and also fit within slots 97 in the X-Y shifter 98. The shifter 98 also has a center aperture 99 for permitting passage of the input shaft therethrough.

The ring gear 96 has internal teeth as clearly depicted in FIG. 10. These teeth are adapted to receive the external teeth on an inner gear 100. This inner gear 100 has secured integrally therewith, an output end 102 with an eccentrically disposed pin 104. The pin 104 is adapted to engage with a second coupling plate 94. In FIG. 8 like reference characters are employed to identify like components in each stage. Thus, the second stage, in addition to including the coupling plate 94, also includes an inner gear 100 and a ring gear 96. The second inner gear 100 couples directly to the output shaft 106. The output shaft 106 rides in a bearing 108 in the output end plate 82.

In this last embodiment, as mentioned previously, the input drive is to the ring gear rather than the inner gear and the output is taken from the inner gear. The ring gear is not driven rotatably but is instead displaced under control of the coupling plate 94 with the ring gear essentially moving in X-Y coordinates with it being continuously in engagement with the inner gear 100. The speed reduction is again a function of the difference in number of teeth between the inner and outer gears.

FIG. 11-13 illustrate the principles of the present invention as applied to a boat/trailer winch or the like type winch device. This winch comprises a U-shaped bracket 120 having side walls 122 and 124 between which is supported the spool member 126. The winch has a handle 128 having at one end a hand crank 130. The handle 128 is secured to the operating shaft 132 by means of the nut 134. There may be provided one or more bushings 136 or the like bearings for supporting the input end of the shaft 132. The shaft 132 extends through the central portion of the spool and has at its other end an eccentric cam 138 and associated bearing end 140. The bearing end 140 is supported within the side wall 124 and is retained in place by means of a snap ring 142.

At one end of the spool 126 there is defined between the spool and the end wall 122 an open space. However, at the opposite end of the spool there is provided between the spool and the end wall 124 both the pinion gear 144 and the ring gear 146. The ring gear 146 is secured to the spool 126 by means of a series of rivets 148. Preferably four rivets 148 are employed.

The pinion gear 144 has a centrally disposed hole for receiving the cam 138 associated with the shaft 132. As indicated in FIG. 12 this cam is eccentrically disposed so as to drive the pinion gear eccentrically with the teeth of the pinion gear engaging with the internally arranged teeth on the ring gear 146. The pinion gear 144 is prevented from rotation by means of the guide pin 150 which extends from the pinion gear and engages in the slot 152 in the side wall 124 of the bracket 120. This interlocking of the guide pin and slot prevents the pinion gear from rotating and there is thus instead provided an interfering fit between the pinion and ring gears that causes the ring gear to rotate and a reduced rate which again is the function of the interrelationship between the teeth on the pinion and ring gears. The ratio of speed reduction has been discussed previously in connection with earlier described embodiments.

Figure 14:
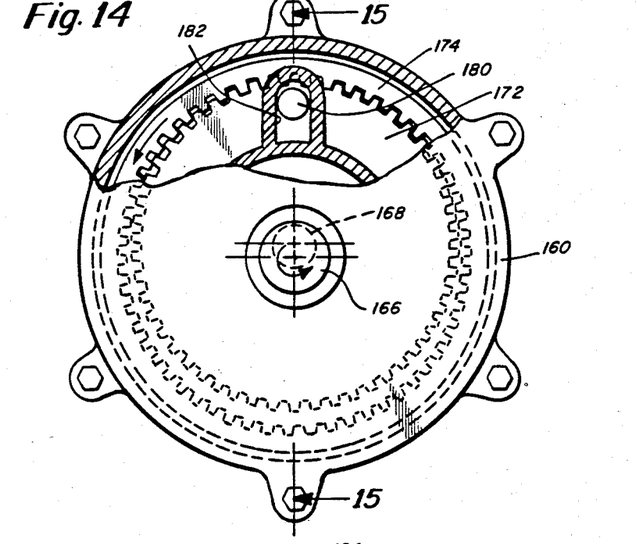
FIG. 14 is a partially cut away end view of another embodiment of the present invention.
Figure 15:
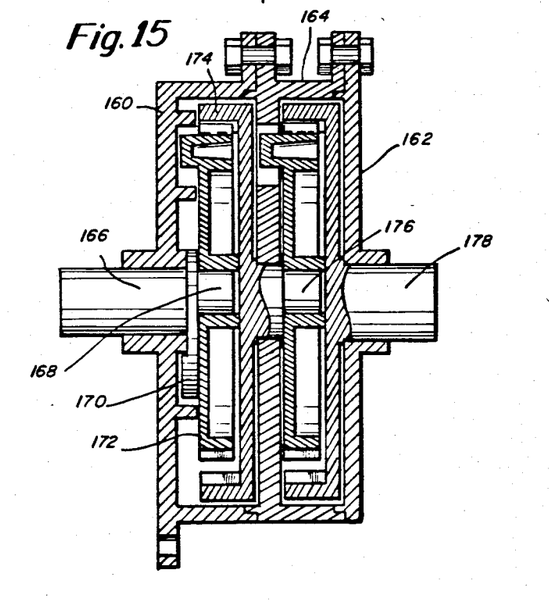
FIG. 15 is a cross-sectional view through this embodiment as taken along line 15—15 of FIG. 14.

FIGS. 14 and 15 describe still a further embodiment of the present invention which is a more simplified construction than some of the earlier embodiments described. In this embodiment there is provided a housing that comprises an input section 160, an output section 162, and intermediate section 164. The input shaft 166 has an eccentrically arranged cam pin 168 and an input shaft counterbalance 170. The pin 168 engages the orbiting drive pinion 172. The outer teeth on the pinion 172 likewise engage with internally directed teeth on the driven ring gear 174. The embodiment described in FIGS. 14 and 15 is a two stage assembly. However, it is understood that this can also be provided in either a single stage or any number of multiple stages. Thus, there are actually shown two pinion gears and two ring gears. The left hand ring gear in FIG. 15 has an associated eccentric pin 176 which engages with the pinion gear of the next stage. The right hand ring gear 174 provides directly the output shaft 178.

In this embodiment, rather than having an X-Y shifter such as shown in FIG. 9, the housing itself provides a means for limiting rotation of the pinion gear. Thus, the pinion gear in this last embodiment has a pin 180 that is captured by the circumscribing wall 182 of the housing. The wall 182 is provided both on the input section of the housing and the intermediate section of the housing. Thus, the pinion in this manner is held non-rotatable while at the same time or orbiting at its center. The ring gear shifts rotatably due to the interaction of the ring and pinion gear teeth.

Figure 16:
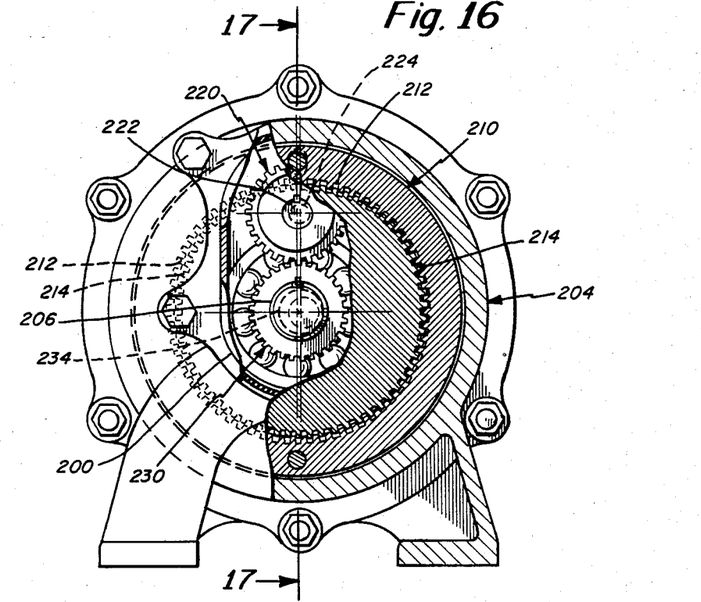
FIG. 16 is a partially cut away view of still another embodiment of the speed reducer of this invention.
Figure 17:
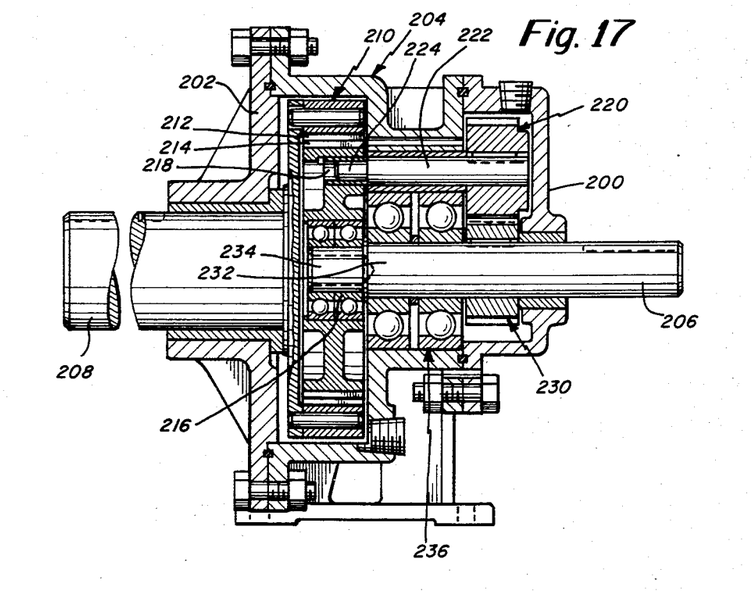
FIG. 17 is a cross-sectional view of the embodiment of FIG. 16 as taken along line 17—17 of FIG. 16.
Figures 26, 27:
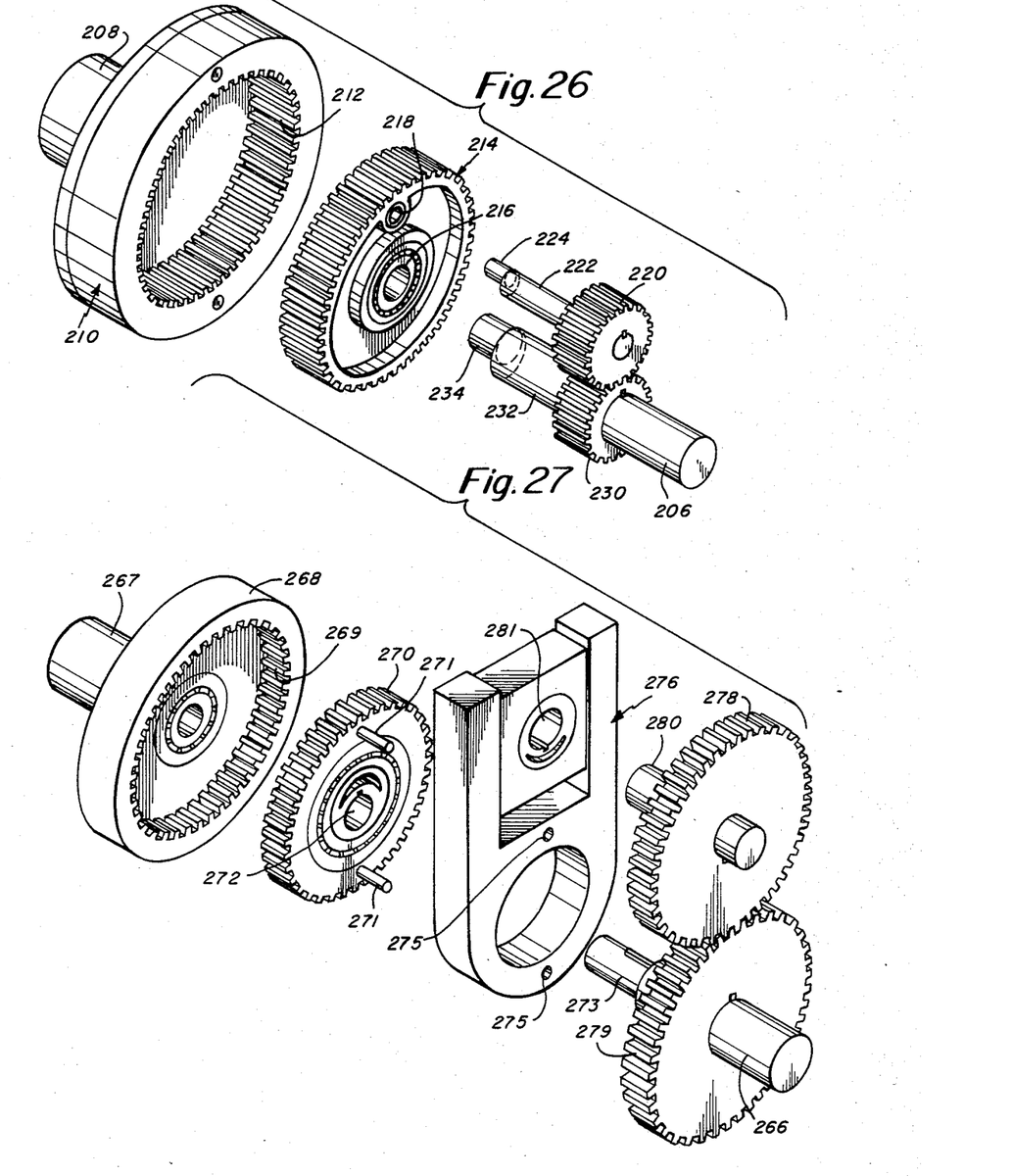
FIG. 26 is an exploded perspective view related to the embodiment of FIGS. 16 and 17.
FIG. 27 is an exploded perspective view related to the embodiment shown in FIGS. 20-22.

FIGS. 16 and 17 illustrate still a further embodiment of the present invention employing a different type of eccentric arrangement. This embodiment is more simplified than some of the earlier embodiments not requiring as many components and is of more simplified overall construction. Reference is also made to FIG. 26 which shows an exploded perspective view showing some of the components of FIGS. 16 and 17.

In FIGS. 16, 17, and 26, the speed reducer comprises an input end plate 200, an output end plate 202 and housing member 204. The input shaft 206 is shown extending through the input end plate 200. Similarly, the output shaft 208 is shown extending through the output end plate 202. The end plates and the housing member 204 together define a housing in which are disposed a number of gear members.

The output shaft 208 is secured to, and forms part of the ring member 210 having internally disposed ring gear teeth 212. There is provided an inner gear 214 of smaller diameter than the diameter of the teeth of the ring gear. The inner gear 214 has a centrally disposed hole which carries bearing 216. The inner gear 214 also has at its outer periphery, a hole 218.

Figures 24, 25:
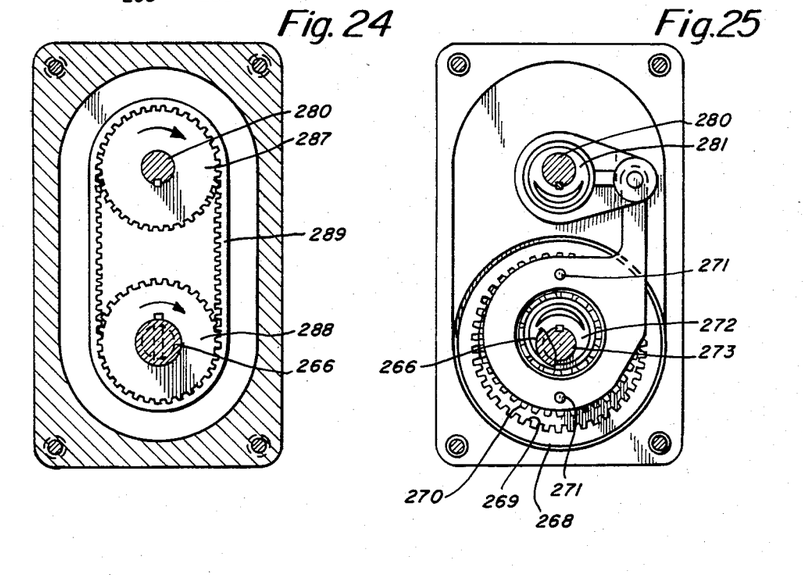
FIG. 24 is still a further alternate embodiment of the present invention.
FIG. 25 is an alternate embodiment of the yoke arrangement of FIG. 22.

Also supported within the housing member 204 between the end plates, is a small gear 220 having extending therefrom, shaft 222 having at the very end thereof as illustrated in FIG. 24, an eccentric cam 224. The cam 224 is adapted to mate with the hole 218 in the inner gear 214. The gear 220 mates with a further gear 230 of approximately the same size. The gear 230 has the input shaft 206 for support thereof. The shaft 206 at its end 232 is provided with a cam 234. The cam 234 is supported by the bearing 216 in the inner gear 214. The input shaft 206 as illustrated in FIG. 17 is also supported by bearings 236.

Upon rotation of the input shaft 206, the eccentric cam 234 causes the inner gear 214 to rotate in the ring gear 212. The mated gears 220 and 230 along with the second cam 224 maintain the inner gear 214 in engagement with the ring gear causing the ring gear to rotate at a reduced speed thus causing a reduction in speed at the output shaft 208.

Figures 18, 19:
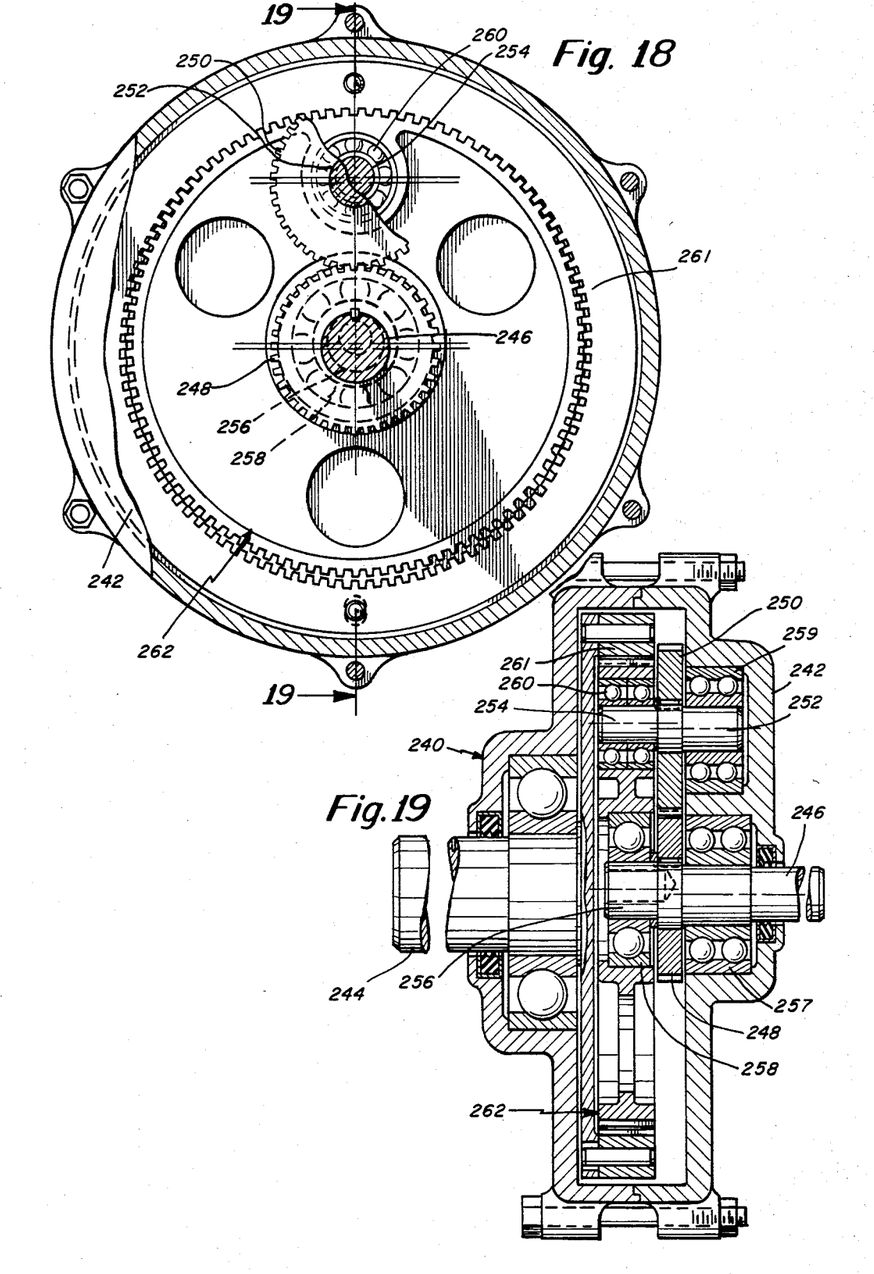
FIG. 18 is a side elevation view of another embodiment of the present invention.
FIG. 19 is a cross-sectional view taken along line 19—19 of FIG. 18.

The embodiment of FIGS. 18 and 19 is quite similar to the embodiment of FIGS. 16 and 17. In FIGS. 18 and 19, there is provided housing members 240 and 242. The housing member 240 supports the output shaft 244. The housing member 242 supports the input shaft 246. The input shaft 246 carries a gear 248 which is adapted to mesh with a like small gear 250. The gear 250 is supported on a shaft 252. The shaft 252 has associated therewith a cam 254. Similarly, the shaft 246 has associated therewith, a cam 256. The shaft 246 is supported by bearings 257 while the cam 256 is supported by bearings 258. The shaft 252 is supported by bearings 259 and the cam 254 is supported by bearings 260.

FIGS. 18 and 19 also illustrate the ring gear 261 which is adapted to mesh with the inner gear 262. The inner gear 262 carries the bearings 260 for receiving the cam 254.

Figures 20, 21:
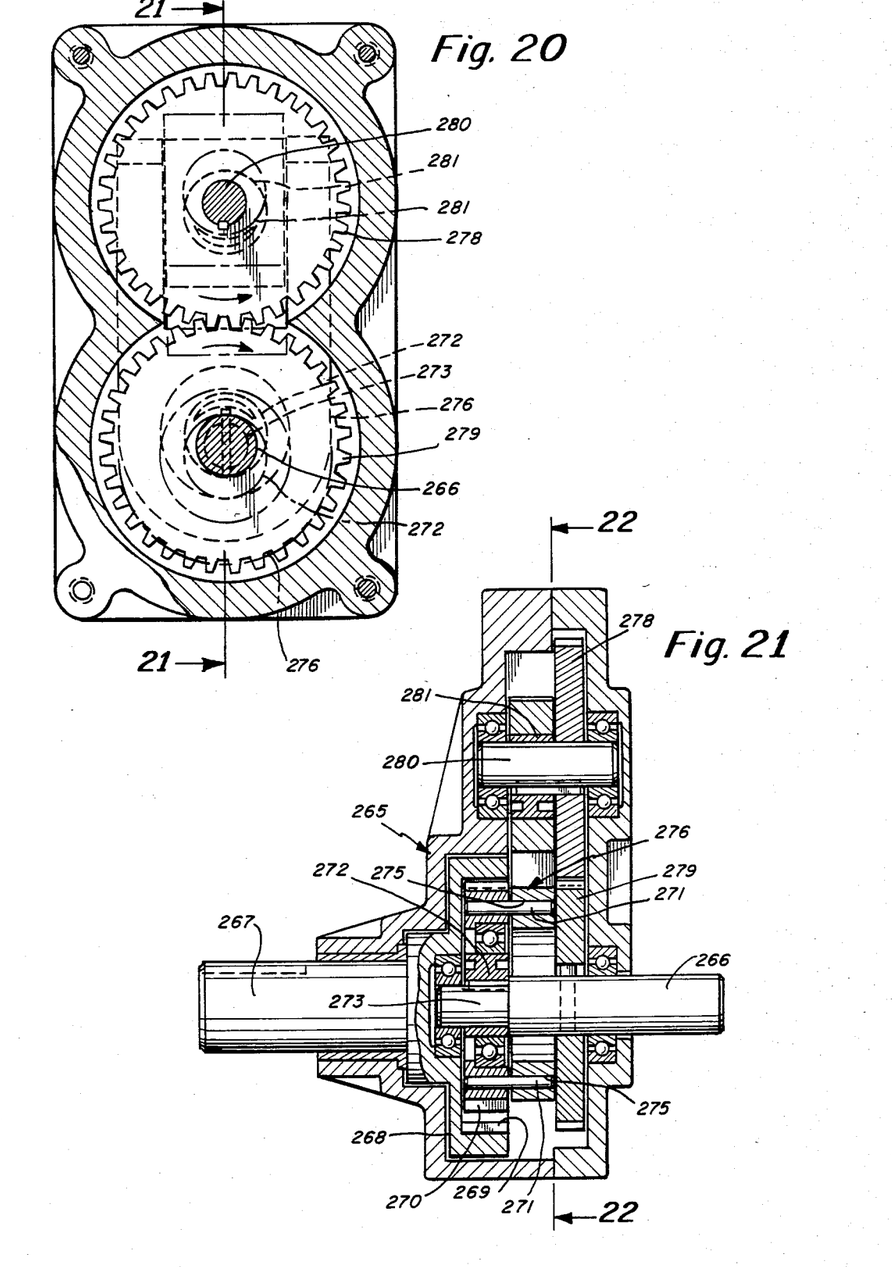
FIG. 20 is a side elevation view of still another embodiment of the present invention.
FIG. 21 is a cross-sectional view taken along line 21—21 of FIG. 20.
Figures 22, 23:
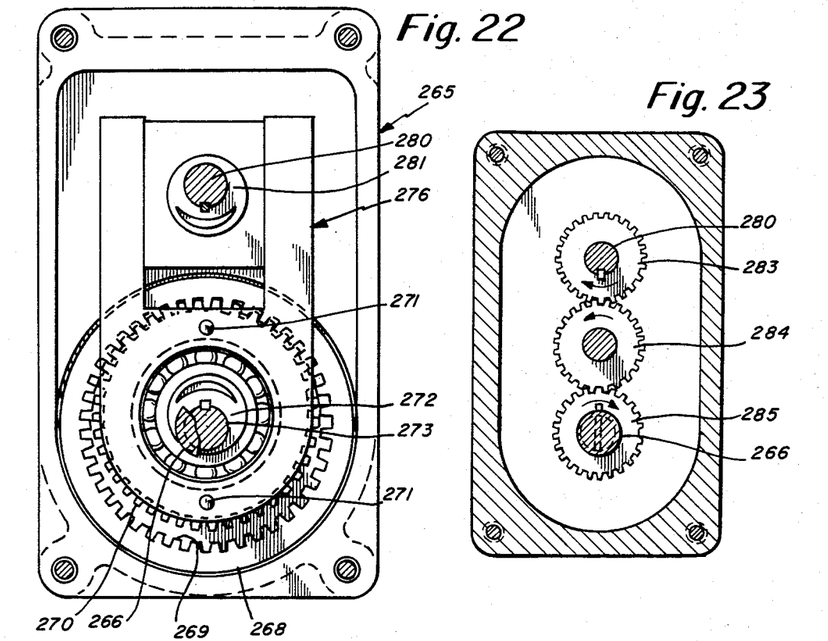
FIG. 22 is a further cross-sectional view taken along line 22—22 of FIG. 21.
FIG. 23 is an alternate embodiment of the present invention.

The next embodiment of the present invention is illustrated in FIGS. 20-22. In this embodiment there is provided a housing 265 having an input shaft 266 and an output shaft 267. The output shaft 267 supports and is integral with the ring gear member 268 having inner disposed ring gear teeth 269. The teeth 269 of the ring gear interengage with the teeth of an inner gear 270. The inner gear 270 has diametrically disposed rods 271 extending therefrom. The inner gear 270 has a hole 272 that is keyed to the input shaft 266 at the end 273. The rods 271 extending from the inner gear 270 are received in holes 275 in the yoke member 276.

FIGS. 20, 21, and 22 along with FIG. 27 also illustrate the cam gears 278 and 279. The gear 278 is secured to a shaft 280 received in the hole 281 associated with the yoke member 276. The gear 279 is fixedly keyed to the input shaft 266.

FIG. 23 shows an alternate embodiment of the invention in which three gears 283, 284 and 285 essentially replace the gears 278 and 279 of the embodiment illustrated in FIG. 20. FIG. 24 shows still another alternate embodiment for the use of cam gears employing cam gears 287 and 288 interconnected by belt 289.

Finally, FIG. 25 shows still another alternate embodiment for the yoke construction of FIG. 22.

Having described one embodiment of the present invention, it should now be apparent to those skilled in the art that numerous other embodiments are contemplated as falling within the scope of this invention.

What is claimed is:

1. A speed changing mechanism comprising:

a housing, first and second gear means supported in the housing in planar relationship with one of the gears having external teeth and the other internal teeth and with the number of teeth of one of the gears being less than the number of teeth of the other gear, means defining an output shaft from said first gear means, said second gear means having a substantially centrally disposed hole and a peripherally disposed hole, a first pinion gear, means defining an input shaft supporting said first pinion gear and a first cam means received in the centrally disposed hole of said second gear means, and a second pinion gear and associated second cam means supported in the peripheral hole of said second gear means.

2. A speed changing mechanism as set forth in claim 1 wherein said pinion gears are interengaged.

3. A speed changing mechanism as set forth in claim 2 wherein said cam means comprise eccentric lobes on a support shaft.

4. A speed changing mechanism comprising:

a housing, first and second gear means supported in the housing in planar relationship with one of the gears having external teeth and the other internal teeth and with the number of teeth of one of the gears being less than the number of teeth of the other gear, yoke means supported adjacent said first and second gear means, first and second cam gears supported adjacent said yoke means and on the opposite side to said first and second gear means, said first and second cam gears adapted to be intermeshed with one of said cam gears supported on an input shaft and the other of said cam gears also supported on a shaft extending to said yoke means.

5. A speed changing mechanism as set forth in claim 4 wherein said yoke means is substantially U-shaped having a lower hole for receiving said input shaft which extends from one of said cam gears to said second gear means.

6. A speed changing mechanism as set forth in claim 5 including means defining an output shaft coupled from said first gear means.

* * * * *